United States Patent
Simernitski et al.

(10) Patent No.: US 9,727,445 B2
(45) Date of Patent: Aug. 8, 2017

(54) DEBUGGING A WEB APPLICATION LOCALLY DURING DEVELOPMENT

(71) Applicant: MICROSOFT TECHNOLOGY LICENSING, LLC., Redmond, WA (US)

(72) Inventors: Iouri Simernitski, Redmond, WA (US); Doug Bunting, Woodinville, WA (US); David Zhao, Bellevue, WA (US); Chakkaradeep Chinnakonda Chandran, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 392 days.

(21) Appl. No.: 14/076,189

(22) Filed: Nov. 9, 2013

(65) Prior Publication Data

US 2015/0135165 A1     May 14, 2015

(51) Int. Cl.
*G06F 9/44* (2006.01)
*G06F 11/36* (2006.01)

(52) U.S. Cl.
CPC ........ *G06F 11/3664* (2013.01); *G06F 11/362* (2013.01)

(58) Field of Classification Search
CPC ....................................................... G06F 9/44
USPC ................................. 717/124, 125, 126, 127
See application file for complete search history.

(56) References Cited

U.S. PATENT DOCUMENTS

| | | | |
|---|---|---|---|
| 5,999,964 A * | 12/1999 | Murakata | G06F 9/546 709/201 |
| 6,119,247 A | 9/2000 | House et al. | |
| 6,263,456 B1 * | 7/2001 | Boxall | G06F 11/362 709/217 |
| 7,921,216 B2 | 4/2011 | Critchley et al. | |
| 7,925,692 B2 | 4/2011 | Dunagan | |
| 8,145,726 B1 * | 3/2012 | Roche | G06F 11/3688 709/219 |
| 8,180,845 B2 | 5/2012 | Brendle et al. | |
| 8,484,716 B1 * | 7/2013 | Hodgson | H04L 63/02 726/11 |
| 9,189,355 B1 * | 11/2015 | Moturu | G06F 11/301 |
| 2003/0066053 A1 * | 4/2003 | Al-Azzawe | G06F 11/3624 717/127 |

(Continued)

OTHER PUBLICATIONS

Swanson, Trent, "Remote Debugging Windows Azure Cloud Services with Visual Studio 2012", Retrieved at: <<http://blog.fullscale180.com/post/2012/10/07/Remote-Debugging-Windows-Azure-Cloud-Services-with-Visual-Studio-2012>>, Oct. 7, 2012, pp. 6.

(Continued)

*Primary Examiner* — Jae Jeon (57) ABSTRACT

A web application intended to be called by a cloud service is debugged locally in a developer's machine. A debugging session is configured to initiate execution of the web application in its intended cloud context by utilizing a reverse proxy mechanism to forward network traffic from a calling cloud service to the developer's machine. In a first embodiment, an integrated development environment (IDE) is able to establish a connection with the reverse proxy mechanism during the debugging session. In a second embodiment, a separate process is used to establish the connection with the reverse proxy mechanism where the separate process is outside of the IDE.

20 Claims, 8 Drawing Sheets

(56) References Cited

U.S. PATENT DOCUMENTS

| | | | |
|---|---|---|---|
| 2003/0204645 A1* | 10/2003 | Sharma | G06F 8/10 719/328 |
| 2004/0187083 A1* | 9/2004 | Tracey | H04W 24/02 715/259 |
| 2004/0199629 A1* | 10/2004 | Bomer | G06F 11/362 709/224 |
| 2005/0010678 A1* | 1/2005 | Pugh | G06F 11/362 709/232 |
| 2005/0138113 A1* | 6/2005 | Brendle | H04L 29/06 709/203 |
| 2005/0172168 A1* | 8/2005 | Kilian | G06F 11/362 714/31 |
| 2006/0288332 A1 | 12/2006 | Sagar et al. | |
| 2007/0016696 A1* | 1/2007 | Jerrard-Dunne | G06F 17/3089 709/250 |
| 2007/0130345 A1* | 6/2007 | Da Palma | H04L 69/40 709/227 |
| 2007/0168997 A1* | 7/2007 | Tran | G06F 11/3664 717/129 |
| 2008/0172575 A1* | 7/2008 | Dunagan | G06F 11/3688 714/27 |
| 2009/0177926 A1* | 7/2009 | Schneider | G06F 11/2294 714/37 |
| 2011/0191752 A1* | 8/2011 | Cleraux | G06F 9/44 717/129 |
| 2011/0307948 A1 | 12/2011 | Ranjan et al. | |
| 2012/0005531 A1* | 1/2012 | Manuzak | G06F 11/0709 714/25 |
| 2012/0005659 A1* | 1/2012 | Bonanno | G06F 11/362 717/129 |
| 2012/0042079 A1* | 2/2012 | Ackerman | G06F 9/4843 709/226 |
| 2012/0131555 A1 | 5/2012 | Hossain et al. | |
| 2012/0185561 A1* | 7/2012 | Klein | H04L 67/2814 709/217 |
| 2012/0291009 A1* | 11/2012 | Khare | G06F 8/38 717/109 |
| 2013/0152047 A1* | 6/2013 | Moorthi | G06F 11/368 717/124 |
| 2013/0159779 A1* | 6/2013 | Mickens | G06F 11/3664 714/38.14 |
| 2013/0174126 A1* | 7/2013 | Belihomji | G06F 11/3688 717/127 |
| 2014/0379897 A1* | 12/2014 | Stroomer | H04L 43/50 709/224 |
| 2015/0033205 A1* | 1/2015 | Wintergerst | G06F 11/362 717/124 |
| 2015/0089585 A1* | 3/2015 | Novack | H04L 63/08 726/3 |

OTHER PUBLICATIONS

"Integrated Virtual Debugger for Visual Studio Developer's Guide", Retrieved at: <<http://www.vmware.com/pdf/ws7_visualstudio_debug.pdf>>, Retrieve Date: Aug. 16, 2013, pp. 36.

"Troubleshooting in Windows Azure", Retrieved at: <<http://www.windowsazure.com/en-us/develop/net/best-practices/troubleshooting/>>, Retrieve Date: Aug. 16, 2013, pp. 22.

* cited by examiner

DEBUGGING A WEB APPLICATION LOCALLY DURING DEVELOPMENT

BACKGROUND

Debugging is a part of the development of a web application. Debugging is facilitated through the use of a debugging tool that enables a developer to observe the runtime behavior of the web application and to analyze errors. The debugging tool may be part of an integrated development environment (IDE), running on the developer's workstation, that enables a developer to debug the web application while developing the source code for the web application.

A web application may be implemented as part of a cloud service that may be accessible to multiple users through a public network, such as the Internet. The cloud service accepts one or more requests and returns a response through a set of well-defined interfaces. A cloud service may be composed of a network of servers utilizing various web applications that cooperate in performing a task. A cloud service may collaborate with other services, such as where one cloud service calls another cloud service to perform a subtask.

In developing a web application for use as a cloud service in this context, it is preferable for the developer to debug the web application locally on the developer's computing device. However, the developer needs to execute the web application under operational conditions, such as having a service residing in the cloud calling the web application being developed on the developer's machine.

Tracing, such as logging diagnostic messages during the execution of a web application, is a debugging method used to trace or follow the flow of execution. Tracing is not as effective as interactive debugging where the developer can pause execution to examine the behavior of a software application. Interactive debugging through the installation of a debugging tool in the cloud may not be feasible if the web application runs in a secure environment. The security of other applications executing with the web application may be compromised by the actions of the developer using the debugging tool. In addition, the debugging process may interfere with other customers using the cloud service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A reverse proxy mechanism enables a service operational in a cloud computing environment (i.e., cloud service) to communicate with a developer's machine or computing device without interfering with other users of the cloud service and without compromising with the security of the cloud service. This reverse proxy mechanism is configured in a manner that does not require modification to the cloud service and the reverse proxy mechanism is able to access the developer's machine through a secure public address.

The reverse proxy mechanism enables a web application, intended for use in the cloud service, to be debugged on a developer's machine. The web application may be configured as part of a cloud service that utilizes multiple servers and web applications that interact to perform one or more tasks. When the web application under development is deployed as part of the cloud service, the web application under development may be called by another web application that is part of the cloud service (i.e., calling service). In order for the web application under development to be debugged on the developer's machine, the reverse proxy mechanism is used to establish a connection between the calling service and the developer's machine. This connection enables the calling service to communicate with the web application under development in the developer's machine. The connection is initiated from the developer's machine and the connection is accepted by any firewall between the developer's machine and the calling service.

In a first embodiment, the web application under development executes within a hosted web service on the developer's machine. An IDE interacts with the hosted web service to enable a developer to debug the web application under development. The IDE is able to establish a connection with the calling service to facilitate the reverse proxy mechanism. The reverse proxy mechanism may be implemented as a point-to-point communication link that transmits asynchronously one-way messages from the calling service to the web application under development in the developer's machine. The hosted web service includes a reverse proxy component that requests the messages from a reverse proxy component coupled to the calling service. The messages are then transmitted to the web application under development.

In the second embodiment, the web application under development executes a workflow. The workflow is a specific type of subtask within the web application under development. The subtask normally executes in the cloud computing environment but runs on the developer's machine for debugging purposes. However, in this context, the web application under development cannot establish a connection with the reverse proxy mechanism. Instead, the developer's machine utilizes a separate process to establish the connection with the reverse proxy mechanism in order to receive messages from the calling service which are forwarded to the web application under development in the developer's machine. The separate process is separate from the process executing the web application and the debugging tool or IDE.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The development of a web application, that is to be deployed as part of a cloud service, requires testing and debugging in its intended context in a cloud computing environment. A cloud service may be composed of several services, where each service performs a particular task. Each service may interact with other services that are part of the cloud service. A calling cloud service may call another service to perform a particular task. Each service may be composed of multiple web applications. In order to debug a web application that is called by a calling cloud service, the context of the cloud computing environment needs to be utilized. However, code development and debugging is typically preferred, by a developer, to be performed locally on the developer's machine. It may not be possible to replicate the cloud computing environment onto the developer's machine. This may be due to the developer not having access to the code of the calling cloud service or due to the physical size of the code being too large for installation onto the developer's machine.

In order for the calling cloud service to interact with the web application during a debugging session, the calling cloud service needs to communicate with the developer's machine in a secure manner. The developer's machine may operate in a corporate datacenter having a firewall and a network address translation (NAT) device. The firewall blocks incoming network traffic on certain ports. The NAT device is used when computing devices do not have a fixed Internet Protocol (IP) address and are not directly addressable through a public network, such as the Internet. The configuration of a datacenter in this manner makes it difficult for a calling cloud service to directly communicate with the web application on the developer's machine.

A reverse proxy mechanism is provided that enables the calling cloud service to securely communicate with the developer's machine without interfering with the operation of the cloud service. The reverse proxy mechanism enables a calling cloud service to communicate with the developer's machine without interfering with other users of the calling cloud service and without compromising with the security of the calling cloud service. This reverse proxy mechanism is configured in a manner that does not require modification to the calling cloud service and is able to access the developer's machine through a secure public address. In this manner, it is possible for a developer to debug a web application that is part of a larger cloud service that is executed entirely in the cloud computing environment when deployed for production use.

The reverse proxy mechanism may be implemented as a point-to-point communication link, such as a channel configured to operate in accordance with the Transmission Control Protocol (TCP) protocol (i.e., TCP channel). A channel is a dedicated communication link between two devices. The channel utilizes an endpoint at the end of each of the two devices exchanging messages. Each endpoint has a unique address that may include an IP address and a TCP/IP port number. In addition, an endpoint may include a binding that specifies the type of device that the endpoint communicates with, a contract that specifies the operations supported by the endpoint, and a set of behaviors that indicate local implementation details of the endpoint.

The TCP protocol provides a process for establishing a connection between the devices so that the devices can exchange reliable messages. A connection is a dedicated communication link between two devices. A connection may be implemented through a physical medium that links the devices and a protocol that facilitates the exchange of communications between the devices.

The reverse proxy mechanism may utilize a messaging protocol that uses a simple queue. The messaging protocol is structured to provide a one-way asynchronous queue between the cloud service and the developer's computing device. The cloud service generates a message that is transmitted to the respective message queue. The message queue holds the messages until the reverse proxy component in the developer's computing device requests the messages. The messages are then transmitted from the calling service's reverse proxy component to the reverse proxy component in the developer's computing device using the TCP channel previously established.

The reverse proxy mechanism is not constrained to a TCP channel. Alternatively, the reverse proxy mechanism may be configured to operate through HTTP long polling. HTTP long polling is a persistent or long-lasting HTTP connection or HTTP request between a server and a client. In particular, the reverse proxy component in the developer's computing device may make requests for messages from the calling service's reverse proxy component using an HTTP long polling request.

The developer's computing device may host execution of the web application under development in different contexts. In a first embodiment, the web application under development executes in a hosted web service that is able to establish a connection with the calling service directly. An IDE interacts with the hosted web service to enable a developer to debug the web application under development. The IDE is able to establish a connection with the reverse proxy mechanism. The reverse proxy mechanism may be implemented as a point-to-point communication link that transmits asynchronously one-way messages from the calling service to the web application under development in the developer's machine.

In a second embodiment, the web application does not execute within a hosted web service. The web application executes a workflow within a separate process that is attached to an IDE. The workflow is a specific type of subtask within the web application under development. The subtask normally executes in the cloud computing environment but runs on the developer's machine for debugging purposes. In this embodiment, a client reverse proxy process is used to establish a connection with the calling service's reverse proxy component in order to receive messages from the calling service and to forward them to the web application being debugged.

Debugging a Web Application Locally

Figure 1:
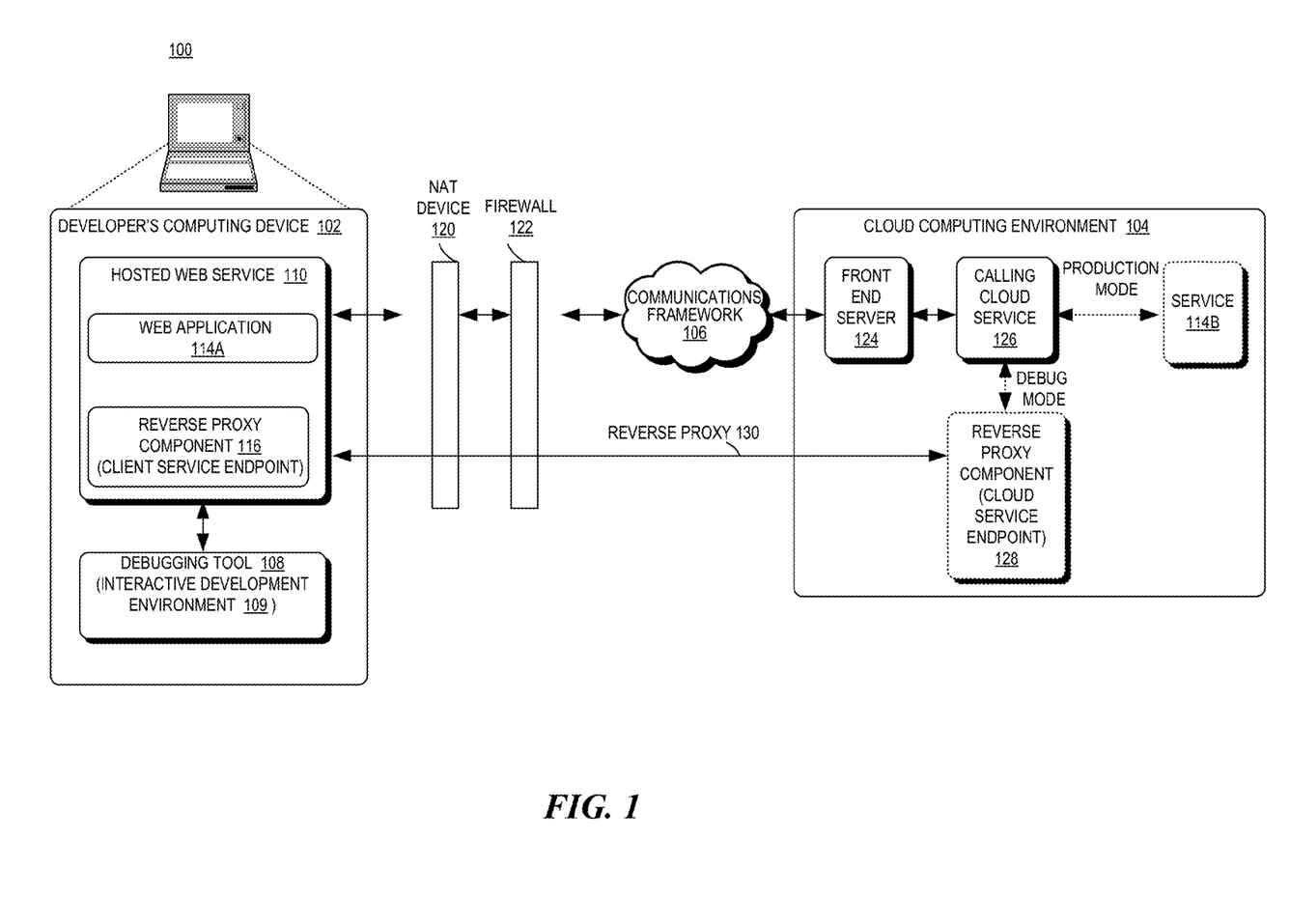
FIG. 1 illustrates a first embodiment of an exemplary system for debugging a web application locally.

Attention now turns to a description of a first embodiment of a system for debugging a web application locally. FIG. 1 illustrates a block diagram of a first embodiment of such a system 100. The system 100 may include a developer's computing device 102 that is connected to a cloud computing environment 104 through a communications framework 106. The developer's computing device 102 may include a debugging tool 108 and a hosted web service 110. The hosted web service 110 may include a web application 114A under development, and a reverse proxy component 116. The developer's computing device 102 may be connected to a NAT device 120 and a firewall 122.

The NAT device 120 and/or the firewall 122 may be part of a private network (not shown). The private network may be a local area network (LAN), campus area network, enterprise private network, and the like. The developer's computing device 102 interacts with the communications framework 106 through the firewall 122 and the network address translation (NAT) device 120. The firewall 122 may be located at the private network's gateway (not shown) to control the incoming and outgoing traffic between a private network and the communications framework 106. Alternatively, the firewall 122 and/or the NAT device 120 may be located in the developer's computing device 102. There also may be multiple firewalls and/or NAT devices installed between the developer's machine and the communications framework 106 in one or more configurations. The firewall 122 acts as a barrier between the developer's computing device 102 and the communications framework 106.

The firewall 122 hides the developer's computing device 102 from being directly accessible by users through a publicly accessible network. The computing devices behind the firewall 122 may be addressable by private addresses that are not visible from a public network, such as the Internet. A single Internet Protocol (IP) address may be associated with one or more private addresses. The IP address is publicly accessible by other devices on the Internet whereas a private address is not visible from the Internet. The NAT device 120 is used to translate between the private addresses and their respective IP address and vice versa. The NAT is able to make the private addresses accessible in one direction.

The communications framework 106 may be any type of communications link capable of facilitating communications between the cloud computing environment 104 and a developer's computing device 102, utilizing any communications protocol and in any configuration, such as without limitation, a wired network, wireless network, or combination thereof. The communications framework 106 may be a wide area network (WAN), such as the Internet.

The developer's computing device 102 is utilized by a developer to develop a web application 114A. The web application 114A may be used as a service hosted by the cloud computing environment, as part of an existing cloud service hosted by the cloud computing environment, or a service hosted by a client machine that interacts with one or more services hosted by the cloud computing environment.

The debugging tool 108 may be any type of software application that enables the developer to monitor the runtime behavior of an application, such as a debugger and the like. The debugging tool 108 involves setting breakpoints to temporarily suspend execution of the web application 114A at certain points in order to examine the state of the web application 114A, such as the values of local variables and so forth. The debugging tool 108 may be part of an integrated development environment (IDE) 109, part of another software application, or a standalone software application. The embodiments are not tied to any particular implementation of the debugging tool.

The web application 114A is developed and debugged using a hosted web service 110 that provides the mechanisms needed to send and receive messages between disparate systems. There are a variety of different transport protocols that may be used to communicate with a service, such as, without limitation, Transmission Control Protocol (TCP), HyperText Transmission Protocol (HTTP), File Transfer Protocol (FTP), HyperText Protocol Secure (HTTPS) and Message Queuing (MSMQ). The hosted web service 110 provides the requisite infrastructure to facilitate messaging between disparate systems that may utilize different transport protocols.

The hosted web service 110 interacts with the web application 114A under development and a reverse proxy component 116. The reverse proxy component 116 accepts messages from a calling cloud service which are then transmitted to the web application 114A being debugged. The firewall does not block the incoming messages from the calling cloud service since the connection between the developer's computing device 102 and the calling cloud service was initiated from the developer's computing device 102.

The cloud computing environment 104 provides a web-accessible or cloud service to users through the Internet. The cloud computing environment 104 may include a front end server 124, a calling cloud service 126, and a reverse proxy component 128. The calling cloud service 126 calls service 114B when operating in production mode to perform one or more subtasks. The service 114B may be implemented as the web application 114A under development. In debug mode, the calling cloud service 126 utilizes the reverse proxy component 128 to communicate with the web application 114A under development instead of service 114B.

The front end server 124 may be used to receive and transmit communications through the world wide web using the HyperText Transfer Protocol (HTTP). The hosted web service 110 on the developer's computing device 102 may interact with the front end server 124 using Representational State Transfer (REST) Application Programming Interfaces (APIs) to communicate with the front end server 124. The REST APIs expose the data and functions needed to interact and exchange information between two devices.

Calling cloud service 126 operates in the cloud computing environment 104 and may be composed of various servers and software applications that interact with each other to provide one or more functions or services. The calling cloud service 126 accepts one or more requests and returns responses through a well-defined communication interface. For example, the calling cloud service 126 may receive search queries, identify web pages in a website that satisfy the search query, and return a list of the web pages in a website that satisfy the search query. In order for the calling cloud service 126 to call the web application under development in the developer's computing device, the calling cloud service 126 needs to communicate directly with the developer's computing device 102. This is accomplished through the reverse proxy.

The reverse proxy 130 may be facilitated through two components: a reverse proxy component 128 that is associated with the cloud computing environment 104 (i.e., cloud service endpoint); and a reverse proxy component 116 that is associated with the developer's computing device 102 (i.e., client service endpoint). Reverse proxy components 116, 128 may be implemented as program code. Reverse proxy component 128 may be part of a traffic server or reverse proxy server in the cloud computing environment 104. The two reverse proxy components 116, 128 communicate through a specific messaging protocol that is configured during the debugging session.

Although the system 100 shown in FIG. 1 has a limited number of elements in a certain configuration, it should be appreciated that the system 100 can include more or less elements in alternate configurations. In one or more embodiments, the cloud computing environment 104 may be the MICROSOFT® WINDOWS AZURE® Cloud Platform and cloud service 126 may be any of the services provided therein, such as without limitation, MICROSOFT® OFFICE365®, MICROSOFT® SHAREPOINT®, and so forth. The debugging tool 108 may be part of an IDE, such as the MICROSOFT® VISUAL STUDIO®. The reverse proxy may be the WINDOWS AZURE® Service Bus and the web application under development may be a WINDOWS® Communication Foundation (WCF) service. However, it should be noted that the technology described herein is not limited to these particular configurations.

Attention now turns to a discussion of operations for the first embodiment of the system with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 2:
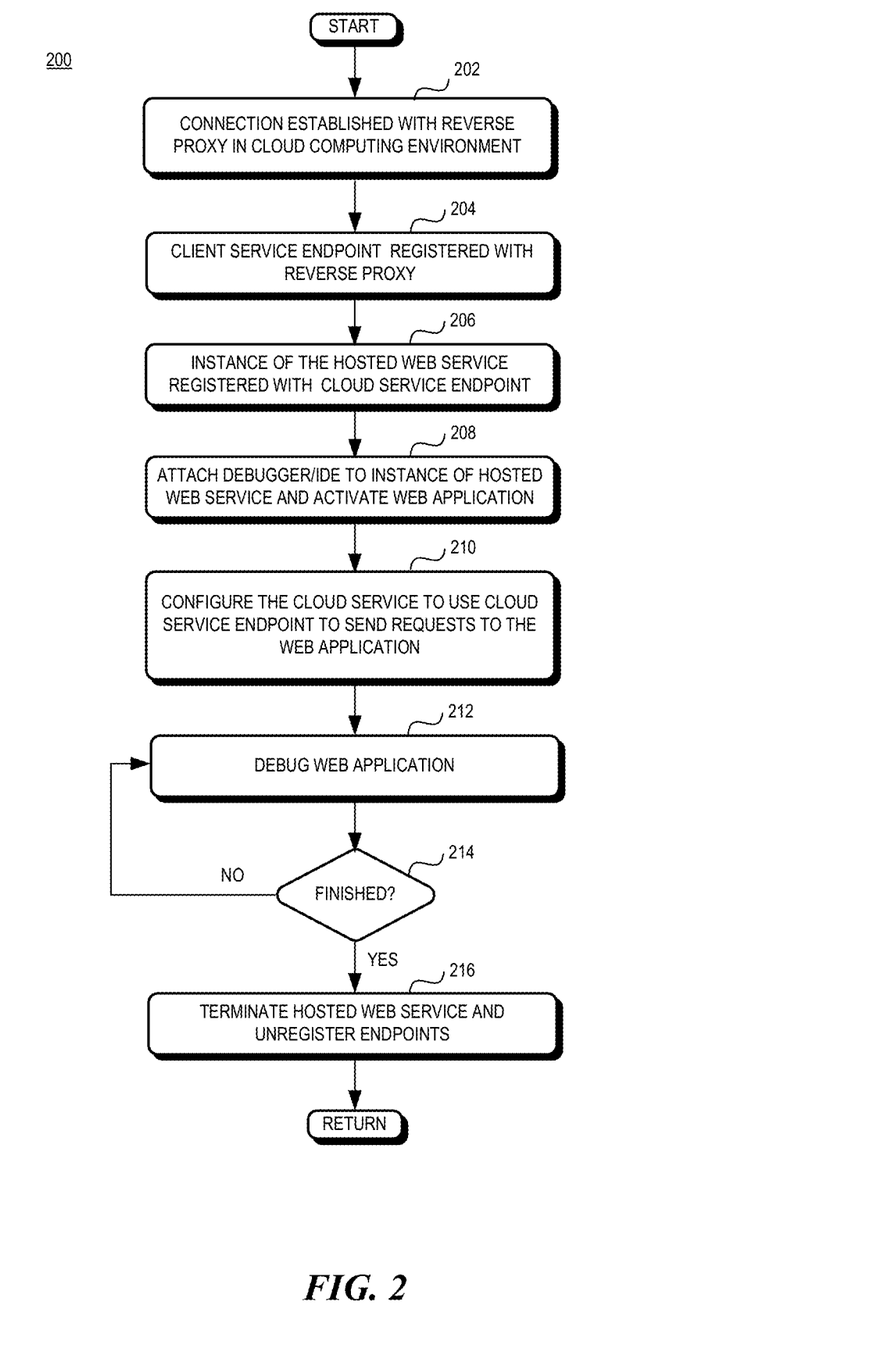
FIG. 2 is a flow diagram illustrating an exemplary method for debugging a web application locally using the system shown in FIG. 1.

FIG. 2 illustrates a flow diagram of an exemplary method for debugging a web application locally with respect to the system 100 shown in FIG. 1. However, it should be noted that the method 200 may be representative of some or all of the operations executed by one or more embodiments described herein and that the method can include more or less operations than that which is described in FIG. 2.

The web application 114A may be configured as a service that may run in production mode in the cloud computing environment. The web application 114A may be debugged using an IDE that provides additional facilities for software development such as editors, compilers, debuggers, interpreters, version control tools, and so forth. However, the embodiments are not constrained to the use of an IDE to debug the web application.

Initially, a developer utilizes the IDE to open a project to create or debug the web application 114A. A project is a starting point in the IDE to create the web application 114A and contains the source code, data connections and references associated with the web application 114A. Once the developer opens the project, the developer connects with the cloud computing environment 104 through an account. The account is associated with credentials that allows the developer to establish a connection with any of the services of the cloud computing environment 104. The cloud computing environment 104 may utilize authentication and authorization techniques to grant permission for the user to access his account and to grant permission to establish a connection with the cloud service endpoint 128 (block 202).

Once the account credentials are authorized, a package is then generated which may include a unique URI for the cloud service endpoint 128 which may include the port number, hostname, and base path of the cloud service endpoint 128. The unique URI and other information used to establish a connection between the cloud service endpoint 128 and the client service endpoint 116. The package is then transmitted to the front end server 124 (block 204).

The developer may initiate a debugging session for the web application 114A. The web application 114A runs inside the hosted web service 110. Since the web application 114A does not have its own dedicated port, the hosted web service 110 is used to facilitate the connections needed for the web application 114A to receive incoming and outgoing communications. The web application 114A may be represented by a service file that contains directives to instantiate an instance of the hosted web service 110 for the web application 114A in a particular manner. An additional instruction is added into the service file so that the instance of the hosted web service 110 is registered with the cloud service endpoint (block 206).

For example, in the case of the web application being a Windows Communication Foundation (WCF) service, the WCF service is associated with a .svc file. The .svc file indicates to the hosted web service 110 that the web application 114A is intended as a WCF service and indicates the type of hosted web service 110 to instantiate. In addition, additional instructions are added in the .svc file so that the instance of the hosted web service 110 is registered with the cloud service endpoint 128.

Next, the IDE 109 or debugging tool 108 is attached to the hosted web service 110. The IDE 109 starts a process and uses this process to attach the hosted web service 110 with the IDE 109. Once attached, the IDE 109 activates the web application 114A by sending a message to the hosted web service 110 to activate the web application 114A (block 208). The web application 114A may be configured to be activated within the cloud. Since the web application 114A cannot activate itself or be activated within the cloud, the IDE 109 acts as a client of the web application 114A in order to activate the web application 114A in the developer's computing device 102. Next, the calling cloud service 126 is configured to use the cloud service endpoint 128 to forward messages to the client service endpoint 116 (block 210).

The web application 114A executes in the hosted web service 110 and interacts with the calling cloud service 126. The client service endpoint 116 requests messages from the cloud service endpoint 128 which are forwarded to the web application 114A. When or shortly after a message is received from the client service endpoint 116, a breakpoint may be hit. At the breakpoint, the developer may analyze the state of the web application 114A and inspect values of local variables, etc. (block 212). The developer may resume execution of the web application 114A and continue to debug the web application 114A (block 214—no) until the debugging session is finished (block 214—yes). At the completion of the debugging session, the debugging session terminates the hosted web service 110, and unregisters the client and service endpoints 116, 128 (block 216).

Debugging a Web Application Through a Workflow Locally

Attention now turns to a second embodiment of the system for debugging a service under development locally. In this embodiment, the web application, on the developer's computing device, utilizes a separate process to establish a connection with the calling service and to configure the reverse proxy mechanism. The web application on the developer's computing device executes a workflow that would normally execute in a service that is part of the cloud computing environment.

A workflow is made of business processes that require routing forms, obtaining approvals, document review, publishing, and so forth. A workflow is made up of a sequence of tasks and events that are executed in a particular order. The workflow may be implemented in a script language, such as in extensible application markup language (XAML), and compiled into a binary format for execution. A runtime environment executes the workflow and the debugging tool starts execution of the runtime environment.

The debugging tool permits the developer to set breakpoints with conditions on workflow activities. Breakpoints are set on activities, such as "Set Breakpoint when Workflow Schedule 1 is received." When the breakpoint is hit, the developer may examine the states of the tasks and variables of the workflow. The developer may change the values of a variable or make other changes to rectify any identified errors. The breakpoints may be set based on a variety of conditions, such as hit count, based on specific activity state changes, and so on.

Figure 3:
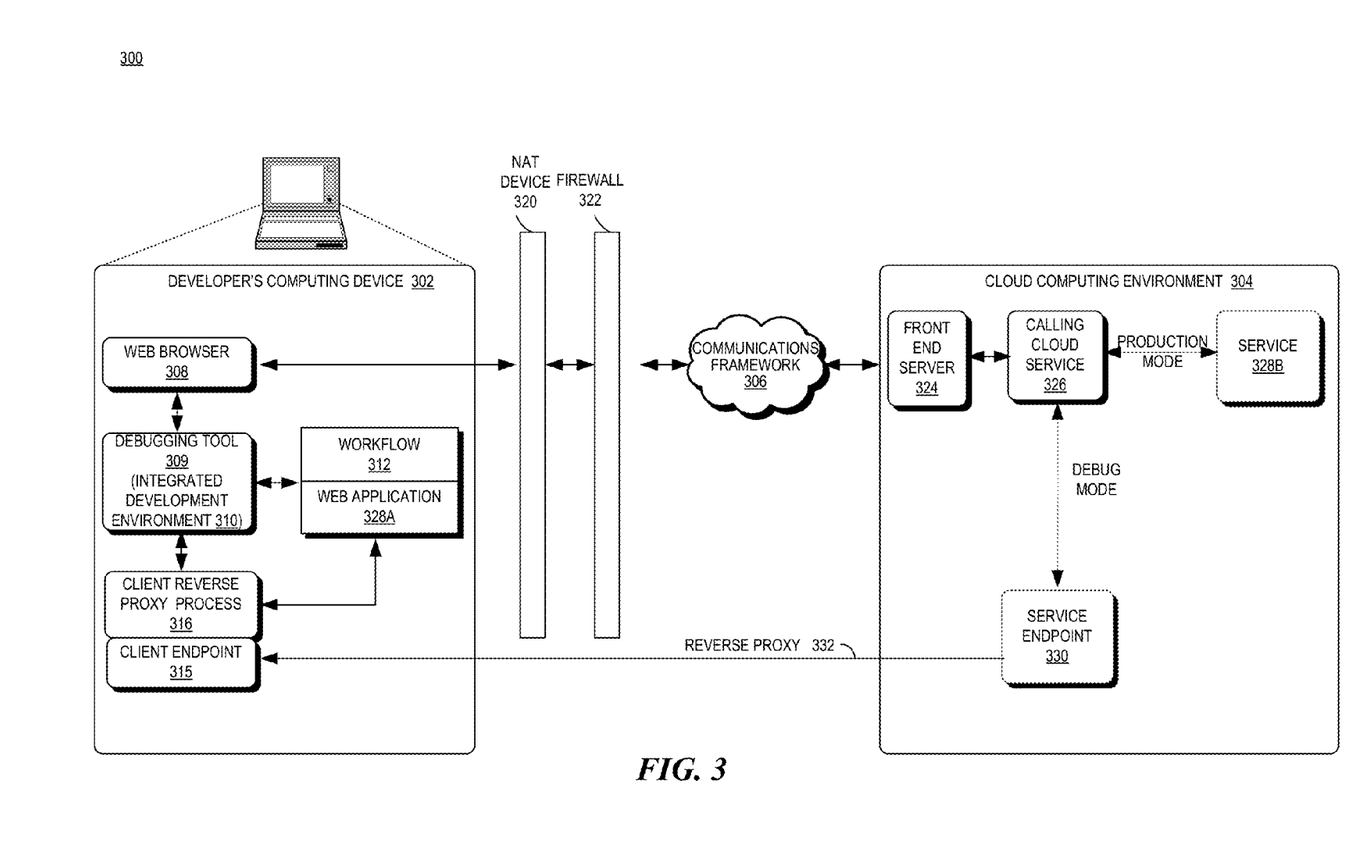
FIG. 3 illustrates a second embodiment of an exemplary system for debugging a web application locally.

Referring to FIG. 3, there is shown an embodiment of such a system. The system 300 may include a developer's computing device 302 that is connected to a cloud computing environment 304 through a communications framework 306. The developer's computing device 302 may include a web browser 308, a debugging tool 309 that may be part of an IDE 310, a web application 328A, a workflow 312, a client reverse proxy process 316, and a client endpoint 315. The developer's computing device 302 may be connected to NAT device 320 and a firewall 322.

The developer's computing device 302 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The developer's computing device 302 interacts with the communications framework 306 through the firewall 322 and the network address translation (NAT) device 320. The firewall 322 may be located at a private network's gateway (not shown) to control the incoming and outgoing traffic between the private network and the communications framework 306. The firewall 322 acts as a barrier between the trusted, secure private network and the communications framework 306. The firewall 322 hides the developer's computing device 302 from being directly accessible by users through a publicly accessible network. Alternatively, the firewall 322 and/or the NAT device 320 may be located in the developer's computing device 302. There may be multiple firewalls and/or NAT devices installed between the developer's computing device and the communications framework 306 in one or more configurations.

The communications framework 306 may be any type of communications link capable of facilitating communications between a gateway (not shown) connected to the developer's computing device 302 and the cloud computing environment 304, utilizing any communications protocol and in any configuration, such as without limitation, a wired network, wireless network, or combination thereof. The communications framework 306 may be a wide area network (WAN), such as the Internet.

The cloud computing environment 304 may include a front end server 324, a calling cloud service 326, service 328B and service endpoint 330. In production mode, the calling cloud service 326 may call service 328B to perform one or more tasks. Service 328B may comprise the web application 328A. In debug mode, a developer edits and/or debugs the web application 328A in the developer's computing device 302. In debug mode, the service 328B is configured to redirect the calling cloud service 326 to utilize the reverse proxy 332 to communicate with the web application 328A under development instead of service 328B. Thus, the workflow executes in web application 328A in debug mode.

The front end server 324 acts as a web server receiving requests from the Internet and replying back with responses. The front end server 324 may be used to receive and transmit communications through the world wide web using HTTP. The developer's computing device 302 may interact with the front end server 324 using REST APIs to communicate with the front end server 324. The REST APIs expose the data and functions needed to interact and exchange information between two devices.

The developer's computing device 302 utilizes a web browser 308 to communicate with the cloud computing environment 304 through request and responses in accordance with a protocol, such as HTTP or REST APIs. The debugging tool 309 may be part of an IDE 310, or other software application, or a stand-alone software application.

The client reverse proxy process 316 is a software application that is separate from the web application 328A, debugging tool 309, and IDE 310. A process may contain one or more threads. A thread is an independent execution unit that executes a subset of the application's instructions or code. The client reverse proxy process 316 is used to establish a connection from within the developer's computing device 302 with the service endpoint 330. Since this connection is established within the developer's computing device 302, the connection is recognized by any firewalls existing between the developer's computing device 302 and the service endpoint 330.

Attention now turns to a discussion of the operations for the embodiments of system 300 with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

In this scenario, the reverse proxy is used to start a workflow resident in the developer's computing device. The initiation of the workflow from the cloud computing environment mimics the same manner the workflow would execute in a production mode. A service in the cloud computing environment is configured to initiate workflows from users through a web browser. The user may select a specific workflow to initiate through use of the web browser. However, the cloud computing environment has to be configured so that it recognizes when the workflow is being debugged locally on the developer's computing device and when the workflow is being executed in the cloud computing environment. In particular, the cloud computing environment needs to know when a request from calling cloud service needs to be forwarded through the service endpoint.

Figure 4:
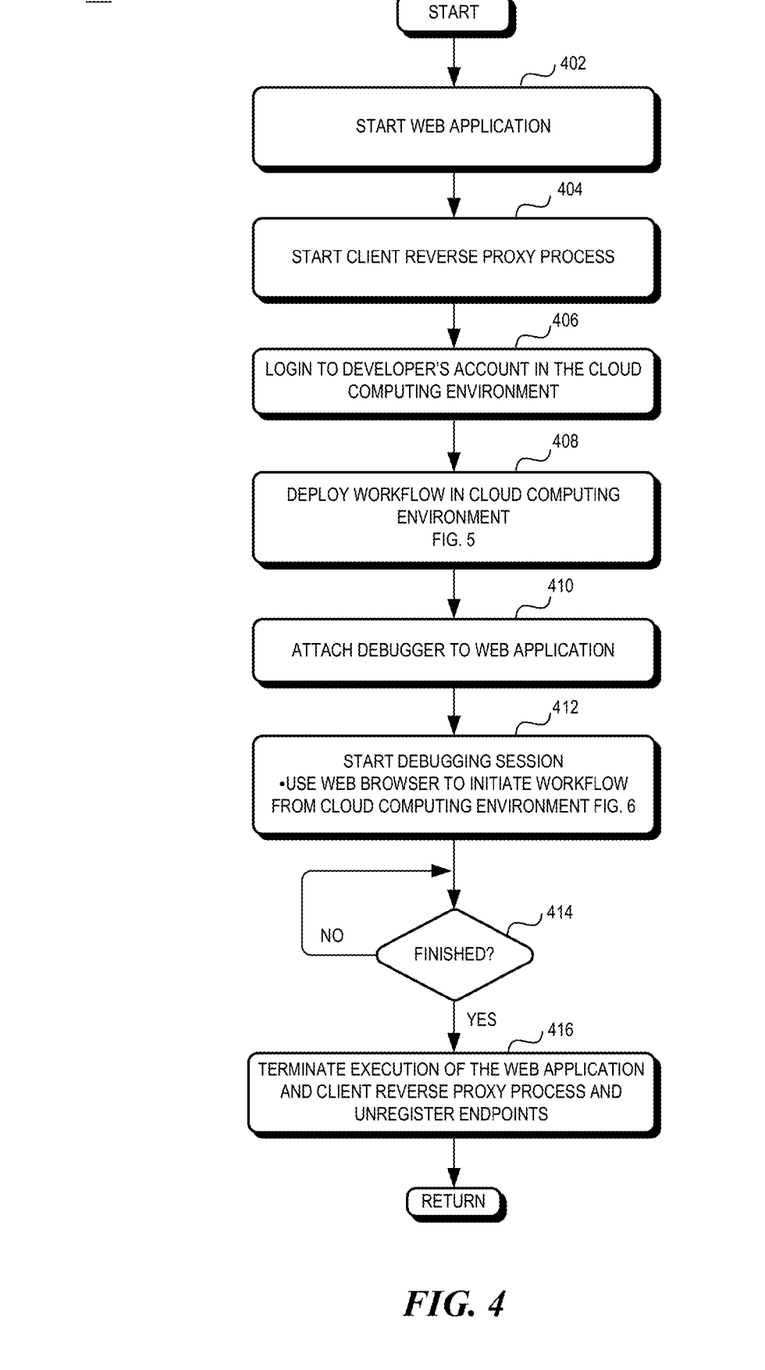
FIG. 4 is a flow diagram illustrating an exemplary method for debugging a web application locally using the system shown in FIG. 2.

FIG. 4 is a block diagram showing an exemplary method 400. The method 400 sets up the cloud computing environment to deploy and start the workflow in the developer's computing device. The deployment involves establishing a connection between the developer's computing device and the calling service to configure the reverse proxy. The method will be described with respect to the developer using a debugging tool inside of an integrated development environment to debug the service. However, it should be noted that the embodiments are not constrained to the use of an IDE or the debugging tool in this manner.

Referring to FIG. 4, initially, the developer utilizes the IDE to open a project to create and/or debug the web application 328A. A project is a starting point in the IDE to create the workflow and/or the web application and contains the source code, data connections and references associated therewith. The developer opens the project and starts execution of the web application 328A (block 402). The client reverse proxy process 316 is then started (block 404).

Next, the developer signs into the developer's account with the cloud computing environment 304. The account is associated with credentials that allow the developer to establish a connection with any of the services of the cloud computing environment 304. The cloud computing environment 304 may utilize authentication and authorization techniques to grant permission to a requested service. The developer uses its credentials to deploy the workflow in the cloud computing environment 304 and to establish a connection with the service endpoint 330 (block 408).

Figure 5:
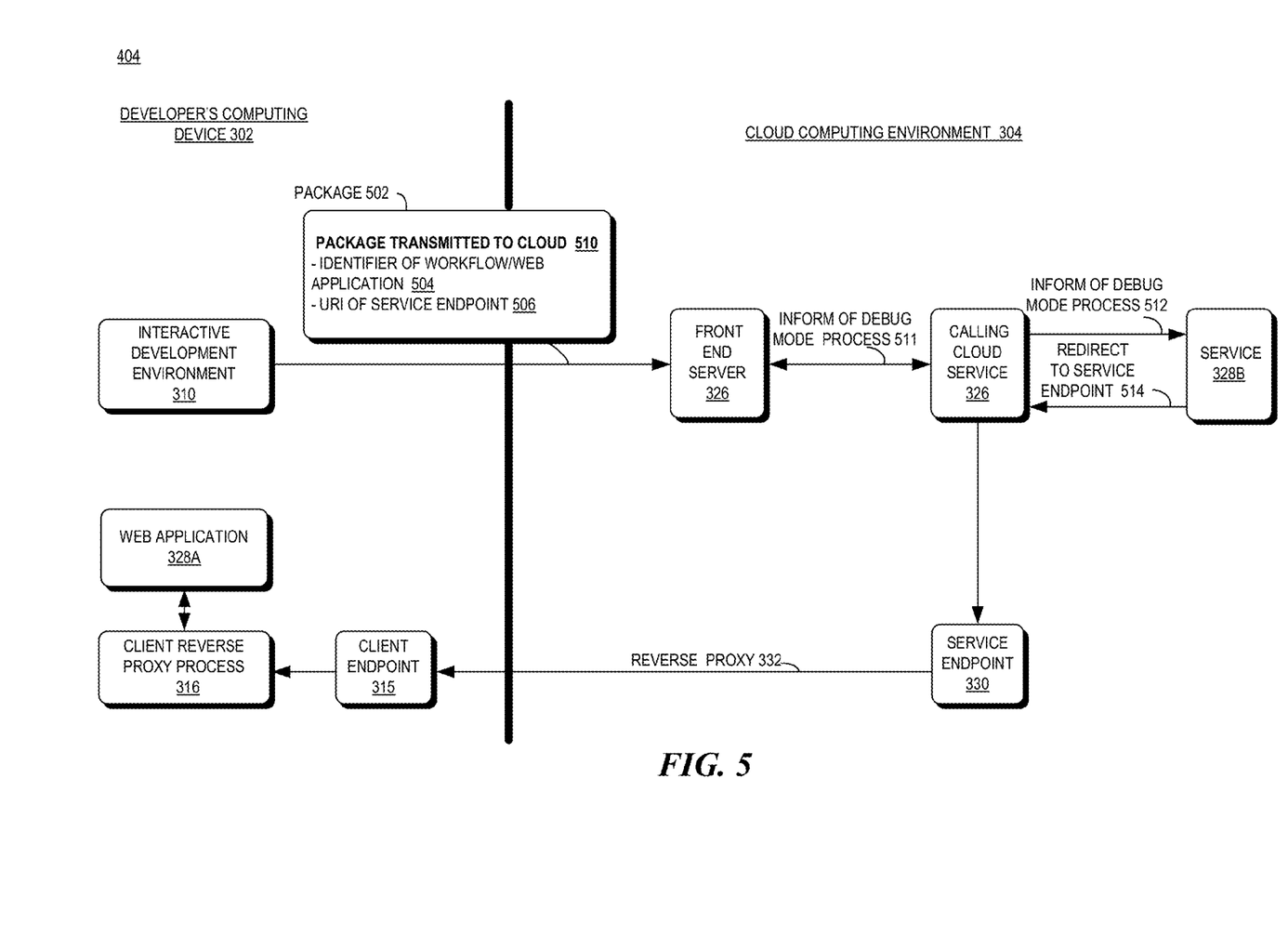
FIG. 5 is a block diagram illustrating deployment of a workflow for debugging a web application locally.

Referring to FIG. 5, the developer obtains the port of service 328B and the hostname of the service endpoint associated with the calling cloud service 326. A package 502 is then generated which may include an identifier of the web application and workflow (504) to be debugged in the developer's computing device 302 and the URI of the service endpoint 330 (506). The URI of the service endpoint 330 may include the hostname, port number, and base path. The package 502 is transmitted to the front end server 324 (block 510).

The front end server 324 informs the calling cloud service 326 of the incoming debug mode process. The calling cloud service 326, in turn, informs service 328B of the incoming debug mode process. Service 328B issues an HTTP redirect to calling cloud service 326 to temporarily forward the network traffic intended for service 328B to service endpoint 330 (block 514). Once this configuration is established, the calling cloud service 326 sends messages intended for service 328B to the service endpoint 330. Client reverse proxy process 316 requests the messages intended for client service endpoint 315 and forwards them to web application 328A.

Referring back to FIG. 4, the debugging tool 309 is attached to the web application 328A (block 410) and the developer starts a debugging session (block 412). The developer may use the web browser 308 to initiate the workflow 312 from the cloud computing environment (block 412) which is shown in FIG. 6.

Figure 6:
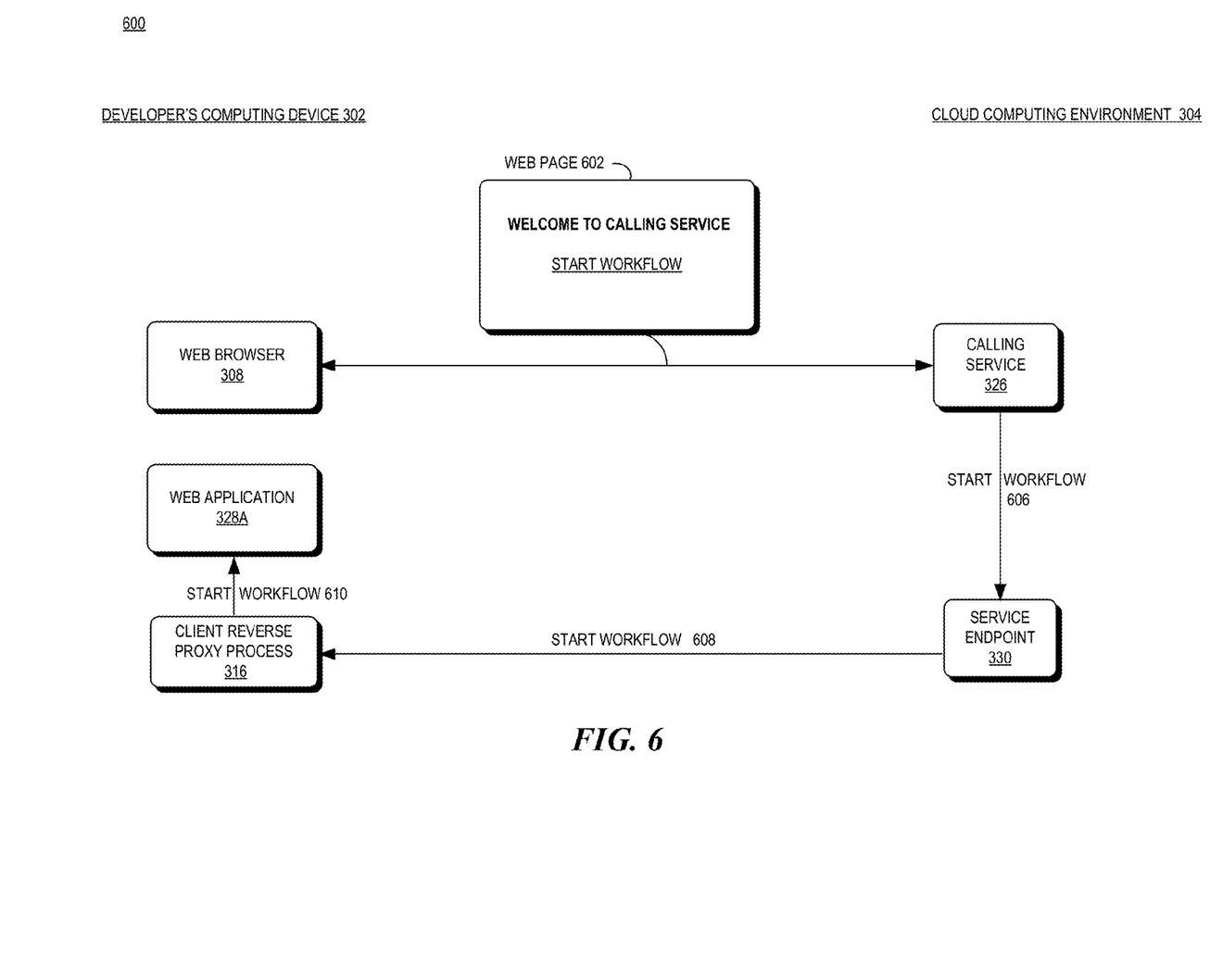
FIG. 6 is a block diagram illustrating initiation of the workflow for debugging a web application locally.

Referring to FIG. 6, the workflow is initiated by the cloud computing environment in the same manner as if the workflow was initiated in production mode. A web browser 308 may be used to request access to the cloud service to execute the workflow. The front end server may return a web page 602 from which the developer selects the workflow. The front end server 324 sends the workflow request to the calling cloud service 326. The calling cloud service 326, in turn, sends a message to initiate the workflow to service endpoint 330 (block 606) which is received by the client reverse proxy process 316 (block 608). Client reverse proxy process 316 then transmits the message to the web application 328A being debugged (block 610).

Returning to FIG. 4, the web application executes the workflow and breakpoints are hit at designated places in the web application. When a breakpoint is hit, the developer may examine the state of the tasks and variables of the workflow. The developer may change the values of a variable or make other changes to rectify any identified errors. The developer continues in the debugging session (block 414—no) until the developer is finished. When the developer finishes the debugging session (block 414—yes), the web application and the client reverse proxy process terminate and the endpoints are unregistered (block 416).

Operating Environment

Figure 7:
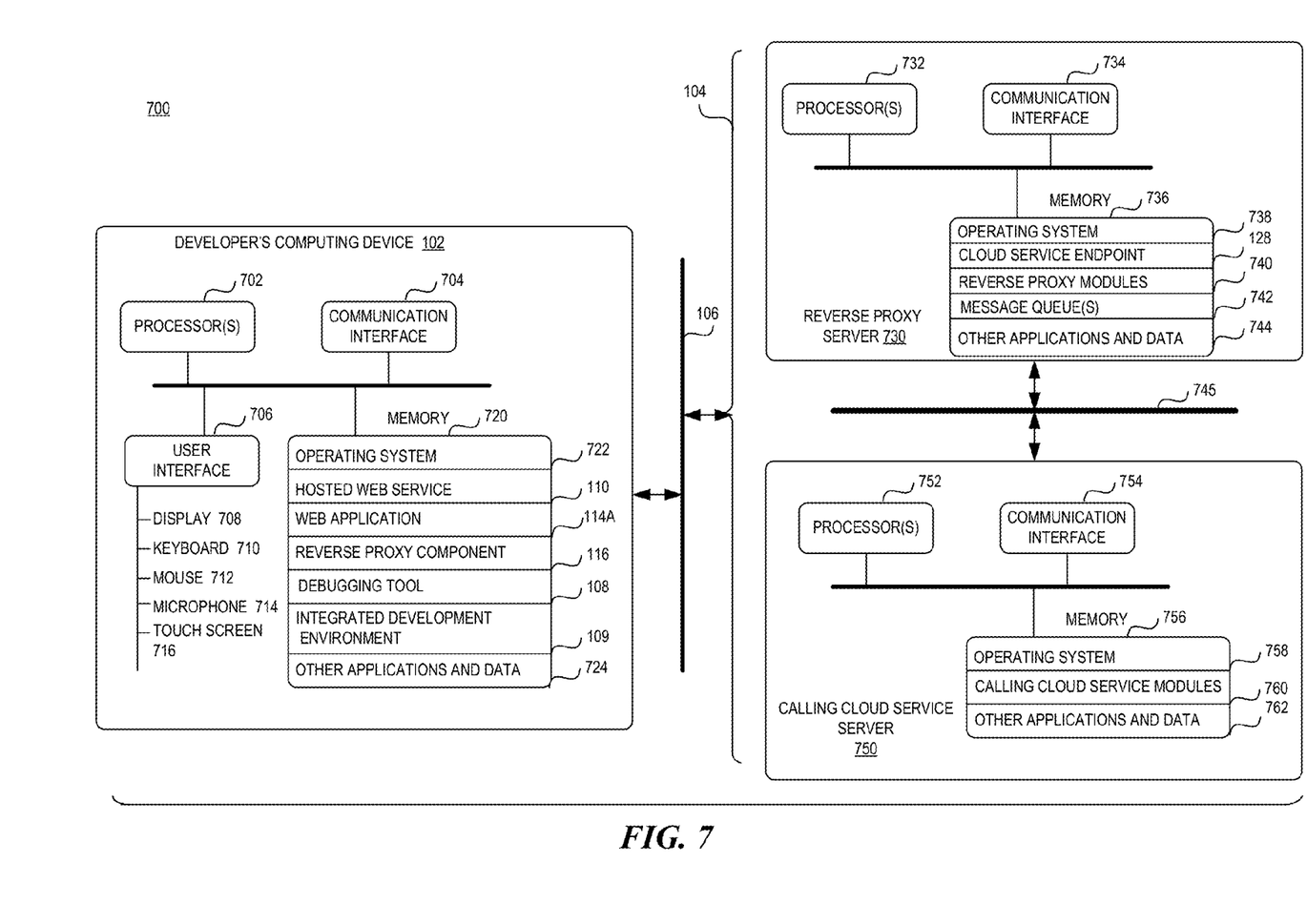
FIG. 7 is a block diagram illustrating a first operating environment.
Figure 8:
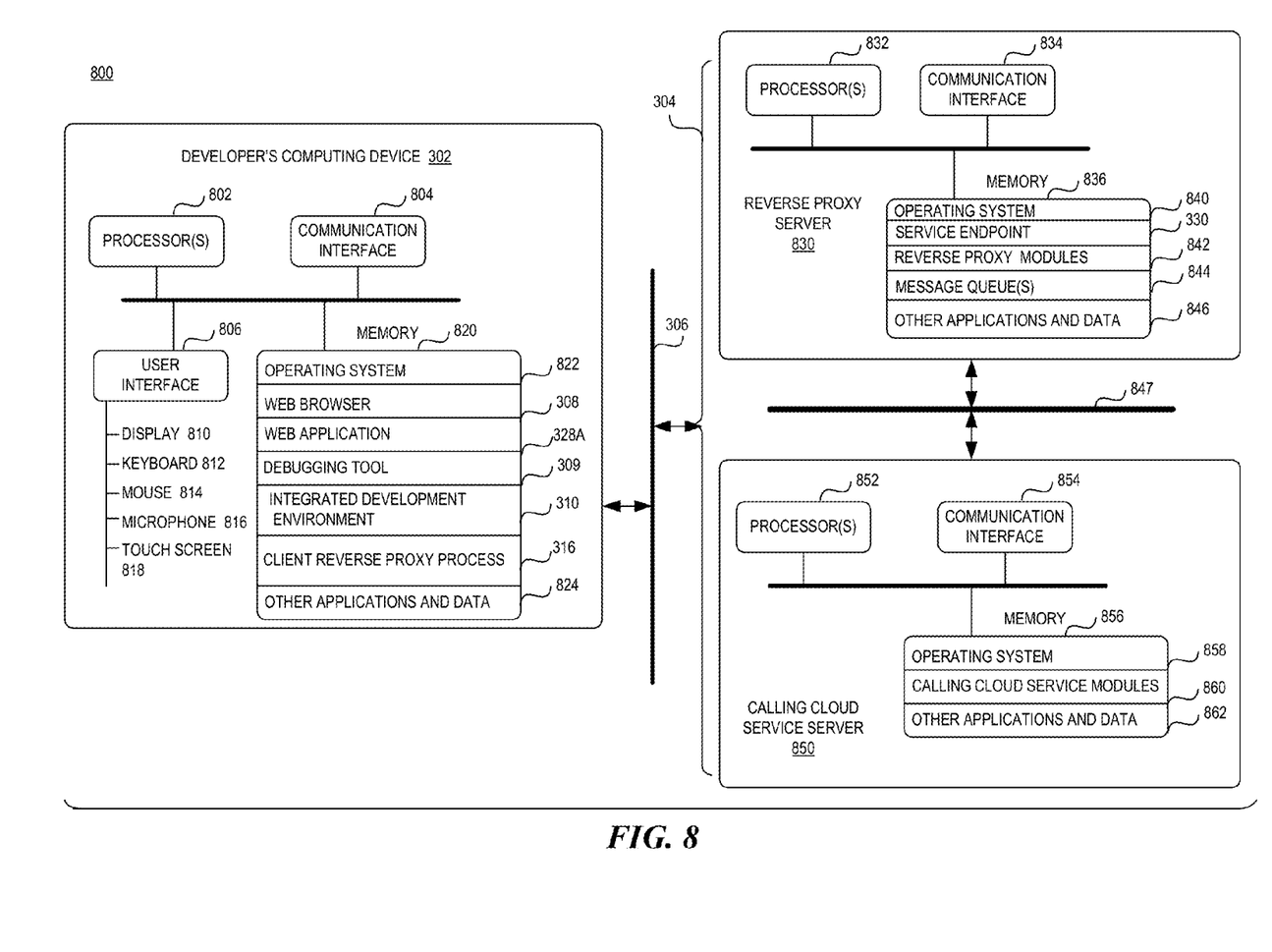
FIG. 8 is a block diagram illustrating a second operating environment.

Attention now turns to a discussion of exemplary operating environments. FIG. 7 illustrates a first operating environment 700 and FIG. 8 illustrates a second operating environment. It should be noted that operating environments 700, 800 are exemplary and are not intended to suggest any limitation as to the functionality of the embodiments.

FIG. 7 illustrates an operating environment 700 having a developer's computing device 102 connected to a reverse proxy server 730 and a calling cloud service server 750 through a communications framework 106. The developer's computing device 102, the reverse proxy server 730, and/or the calling cloud service server 750 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The developer's computing device 102 may include one or more processors 702, a communication interface 704, a user interface 706 and a memory 720. A processor 702 may be any commercially available processor and may include dual microprocessors and multi-processor architectures. The communication interface 704 facilitates wired or wireless communications between the developer's computing device 102 and a communications framework. The user interface 706 facilitates communications between the developer's computing device 102 and input/output (I/O) devices, such as, without limitation, a display 708, a keyboard 710, a mouse 712, a microphone 714, and/or a touch screen 716.

The memory 720 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and so forth, provided that the device does not pertain to propagated signals. The memory 720 may also include one or more external storage devices or remotely located storage devices. The memory 720 may contain instructions and data as follows:

an operating system 722;
a hosted web service 110;
a web application 114A;
a reverse proxy component 116;
a debugging tool 108;
an integrated development environment 109; and
various other applications and data 724.

The communications framework 106 facilitates communications between the computing devices. The communications framework 106 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). The developer's computing device 102, the reverse proxy server 730 and the calling cloud service server 750 may include various types of standard communication elements designed to be interoperable with the communications framework 106, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

The reverse proxy server 730 may be used to facilitate the reverse proxy mechanism. The reverse proxy server 730 may include one or more processors 732, a communication interface 734, and a memory 736. A processor 732 may be any commercially available processor and may include dual microprocessors and multi-processor architectures. The communication interface 734 facilitates wired or wireless communications between the reverse proxy server 730 and other computing devices.

The memory 736 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and so forth provided that the device does not pertain to propagated signals. The memory 736 may also include one or more external storage devices or remotely located storage devices. The memory 736 may contain instructions and data as follows:

an operating system 738;
    a cloud service endpoint 128;
    one or more reverse proxy modules 740 that implement the reverse proxy connection with the developer's computing device;
    one or more message queues 742; and
    various other applications and data 744.

The calling cloud service server 750 is used to perform the functions of the calling cloud service 126. The calling cloud service server 750 may include one or more processors 752, a communication interface 754, and a memory 756. A processor 752 may be any commercially available processor and may include dual microprocessors and multi-processor architectures. The communication interface 754 facilitates wired or wireless communications between computing devices interacting with the calling service server 750.

The memory 756 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and so forth, provided that the memory device does not pertain to propagated signals. The memory 756 may also include one or more external storage devices or remotely located storage devices. The memory 756 may contain instructions and data as follows:

an operating system 758;
    one or more calling cloud service modules 760 that implement the calling cloud service 126; and
    various other applications and data 762.

The reverse proxy server 730 and the calling cloud service server 750 may communicate through a communications framework 745. The communications framework 745 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

FIG. 8 illustrates an operating environment 800 having a developer's computing device 302 connected to a reverse proxy server 830 and a calling cloud service server 850 through a communications framework 306. The developer's computing device 302, the reverse proxy server 830, and/or the calling cloud service server 850 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

The developer's computing device 302 may include one or more processors 802, a communication interface 804, a user interface 806 and a memory 820. A processor 802 may be any commercially available processor and may include dual microprocessors and multi-processor architectures. The communication interface 804 facilitates wired or wireless communications between the developer's computing device 302 and a communications framework. The user interface 806 facilitates communications between the developer's computing device 302 and input/output (I/O) devices, such as, without limitation, a display 810, a keyboard 812, a mouse 814, a microphone 816, and/or a touch screen 818.

The memory 820 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and so forth, provided that the memory device does not pertain to propagated signals. The memory 820 may also include one or more external storage devices or remotely located storage devices. The memory 820 may contain instructions and data as follows:

an operating system 822;
    a web browser 308;
    a web application 328A;
    a debugging tool 309;
    an integrated development environment 310;
    a client reverse proxy process 316; and
    various other applications and data 824.

The communications framework 306 facilitates communications between the computing devices. The communications framework 306 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). The developer's computing device 302, the reverse proxy server 830 and the calling cloud service server 850 may include various types of standard communication elements designed to be interoperable with the communications framework 306, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

The reverse proxy server 830 may be used to facilitate the reverse proxy mechanism. The reverse proxy server 830 may include one or more processors 832, a communication interface 834, and a memory 836. A processor 832 may be any commercially available processor and may include dual microprocessors and multi-processor architectures. The communication interface 834 facilitates wired or wireless communications between the reverse proxy server 830 and other computing devices.

The memory 836 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 836 may also include one or more external storage devices or remotely located storage devices. The memory 836 may contain instructions and data as follows:
  an operating system 840;
  a service endpoint 330;
  one or more reverse proxy modules 842 that implement the reverse proxy connection with the developer's computing device;
  one or more message queues 844; and
  various other applications and data 846.

The calling cloud service server 850 is used to perform the functions of the calling cloud service 326. The calling cloud service server 850 may include one or more processors 852, a communication interface 854, and a memory 856. A processor 852 may be any commercially available processor and may include dual microprocessors and multi-processor architectures. The communication interface 854 facilitates wired or wireless communications between computing devices interacting with the calling cloud service server 850.

The memory 856 may be any computer-readable storage media that may store executable procedures, applications, and data. The computer-readable storage media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and so forth, provided that the memory device does not pertain to propagated signals.

The memory 856 may also include one or more external storage devices or remotely located storage devices. The memory 856 may contain instructions and data as follows:
  an operating system 858;
  one or more calling cloud service modules 860 that implement the calling cloud service 326; and
  various other applications and data 862.

The reverse proxy server 830 and the calling cloud service server 850 may communicate through a communications framework 847. The communications framework 847 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, comprising:
   hosting, by a developer's computing device, a web service, the web service including a web application configured to execute within a remote web service that operates in a computing device in a cloud computing environment, the developer's computing device and the computing device in the cloud computing environment differ;
   creating, at the developer's computing device, a debugging session to debug the web application on the hosted web service, the web application configured to be called by a calling service that is part of the remote web service; and
   during the debugging session:
     establishing a dedicated connection between the debugging session and the calling service, the connection configured as a reverse proxy that forwards messages only from the calling service to the developer's computing device;
     initiating execution of the web application in the hosted web service; and
     receiving messages from the calling service through the dedicated connection.

2. The computer-implemented method of claim 1, further comprising:
   executing the web application to process a workflow;
   sending a package to the calling service describing the workflow and the web application; and
   redirecting the calling service to forward network traffic intended for the web application to an endpoint associated with the calling service.

3. The computer-implemented method of claim 1, wherein the connection includes a client endpoint associated with the developer's computing device hosting the debugging session and a service endpoint associated with the computing device in the cloud computing environment associated with the calling service.

4. The computer-implemented method of claim 1, wherein the connection is established from within the developer's computing device hosting the debugging session and recognizable by a firewall situated between the developer's computing device and the calling service.

5. The computer-implemented method of claim 3, wherein receiving messages from the calling service through the connection further comprises: issuing a HTTP long polling request to the service endpoint to retrieve messages from the calling service.

6. The computer-implemented method of claim 1,
wherein the debugging session is executed in an integrated development environment (IDE); and
wherein establishing the connection is performed by the IDE.

7. The computer-implemented method of claim 1,
wherein the debugging session is executed in an integrated development environment (IDE); and
wherein establishing the connection is made through a process separate from the IDE.

8. A system comprising:
at least one processor and a memory;
the at least one processor configured to:
host a web service on a developer's computing device, the hosted web service including a web application;
host, on the developer's computing device, a debugging session for the web application in the hosted web service, wherein the web application is configured as part of a remote web service including a calling service, wherein the calling service is configured to communicate with the web application and to execute within the remote web service that is part of a cloud computing environment, and wherein the developer's computing device is separate from the cloud computing environment;
establish a dedicated connection between an endpoint associated with the calling service and an endpoint associated with the debugging session, the connection configured as a reverse proxy used solely by the calling service to forward messages only from the calling service to the developer's computing device;
initiate the debugging session for the web application in the hosted web service on the developer's computing device; and
retrieve messages destined for the web application from the calling service through the endpoint associated with the calling service.

9. The system of claim 8, wherein the connection includes a client endpoint associated with the developer's computing device hosting the debugging session and a service endpoint associated with the cloud computing environment associated with the calling service.

10. The system of claim 9, wherein the debugging session executes within an integrated development environment (IDE) and the IDE establishes the connection with the endpoint associated with the calling service.

11. The system of claim 8, wherein the connection is a transmission control protocol (TCP) channel.

12. The system of claim 8, wherein the connection utilizes a one-way asynchronous message queue.

13. The system of claim 8, wherein the retrieved messages destined for the web application is performed by a client reverse proxy process, the client reverse proxy process separate from a process executing the web application and the debugging session.

14. The system of claim 8, wherein the at least one processor is further configured to:
execute the web application to process a workflow.

15. The system of claim 14, wherein the at least one processor is further configured to:
send a package to the calling service describing the workflow and the web application; and
redirect the calling service to forward network traffic intended for the web application to the endpoint associated with the calling service.

16. A device, comprising:
at least one processor and a memory:
the at least one processor configured to:
establish a dedicated reverse proxy between a calling service, associated with a remote web service, operating on a second computing device in a cloud computing environment and a web application operating on a developer's computing device, the calling service in communication with the web application associated with the remote web service, the reverse proxy used solely to enable communications only from the calling service to the web application when the web application is hosted in a debugging session in a hosted web service operating on the developer's computing device, which is distinct from the second computing device in the cloud computing environment;
initiate the debugging session for the web application in the hosted web service on the developer's computing device, wherein the debugging session is initiated in an integrated development environment (IDE); and
receive messages at the developer's computing device from the calling service through the reverse proxy.

17. The device of claim 16,
wherein the IDE establishes the reverse proxy.

18. The device of claim 16,
wherein a process separate from the IDE and the debugging session establishes the reverse proxy.

19. The device of claim 16, wherein the reverse proxy is configured as a TCP channel between a client endpoint associated with the device and a service endpoint associated with the calling service.

20. The device of claim 16, wherein the reverse proxy is implemented through HTTP long polling between a client endpoint associated with the device and a service endpoint associated with the calling service.

* * * * *